United States Patent
Laycock et al.

(10) Patent No.: US 9,823,698 B2
(45) Date of Patent: Nov. 21, 2017

(54) DISPLAY SLEEVES

(71) Applicants: Larry R. Laycock, Alpine, UT (US); David R. Wright, Kaysville, UT (US); Kenneth James Anderson, Highland, UT (US); Kenneth McKay Anderson, Highland, UT (US)

(72) Inventors: Larry R. Laycock, Alpine, UT (US); David R. Wright, Kaysville, UT (US); Kenneth James Anderson, Highland, UT (US); Kenneth McKay Anderson, Highland, UT (US)

( * ) Notice: Subject to any disclaimer, the term of this patent is extended or adjusted under 35 U.S.C. 154(b) by 0 days.

(21) Appl. No.: 15/605,762

(22) Filed: May 25, 2017

(65) Prior Publication Data

US 2017/0262014 A1   Sep. 14, 2017

Related U.S. Application Data

(63) Continuation of application No. 14/175,097, filed on Feb. 7, 2014, now abandoned.

(51) Int. Cl.
*G06F 1/16* (2006.01)
*A41D 1/00* (2006.01)

(52) U.S. Cl.
CPC .............. *G06F 1/163* (2013.01); *A41D 1/002* (2013.01); *G06F 1/1652* (2013.01); *G06F 1/1684* (2013.01)

(58) Field of Classification Search
None
See application file for complete search history.

(56) References Cited

U.S. PATENT DOCUMENTS

| | | | | |
|---|---|---|---|---|
| 7,377,663 | B2 * | 5/2008 | Desjardin | A41D 13/01 362/103 |
| 8,531,526 | B1 * | 9/2013 | Spence | H04N 7/183 348/158 |
| 2002/0167483 | A1 * | 11/2002 | Metcalf | G09G 3/20 345/156 |
| 2003/0028621 | A1 * | 2/2003 | Furlong | H04L 29/06 709/219 |
| 2004/0187184 | A1 * | 9/2004 | Rubin | A41D 27/085 2/69 |
| 2010/0059561 | A1 * | 3/2010 | Ellis | A61B 5/1038 224/267 |
| 2012/0165616 | A1 * | 6/2012 | Geva | A61B 5/0022 600/300 |

* cited by examiner

*Primary Examiner* — Dorothy Harris
(74) *Attorney, Agent, or Firm* — Maschoff Brennan

(57) ABSTRACT

Some embodiments relate to wearable technology. An example embodiment includes a garment that includes a panel, a sensor, a flexible display device, and a communication module. The panel includes an outer surface. The sensor is integrated into the garment and configured to collect data. The flexible display device is integrated into the outer surface of the panel. The flexible display device is configured to receive and display data. The communication module is communicatively coupled to the flexible display device, the sensor, and a programmable device and is configured to receive data from the programmable device and sensed data from the sensor and to communicate the received data and the sensed data to the flexible display device.

20 Claims, 5 Drawing Sheets

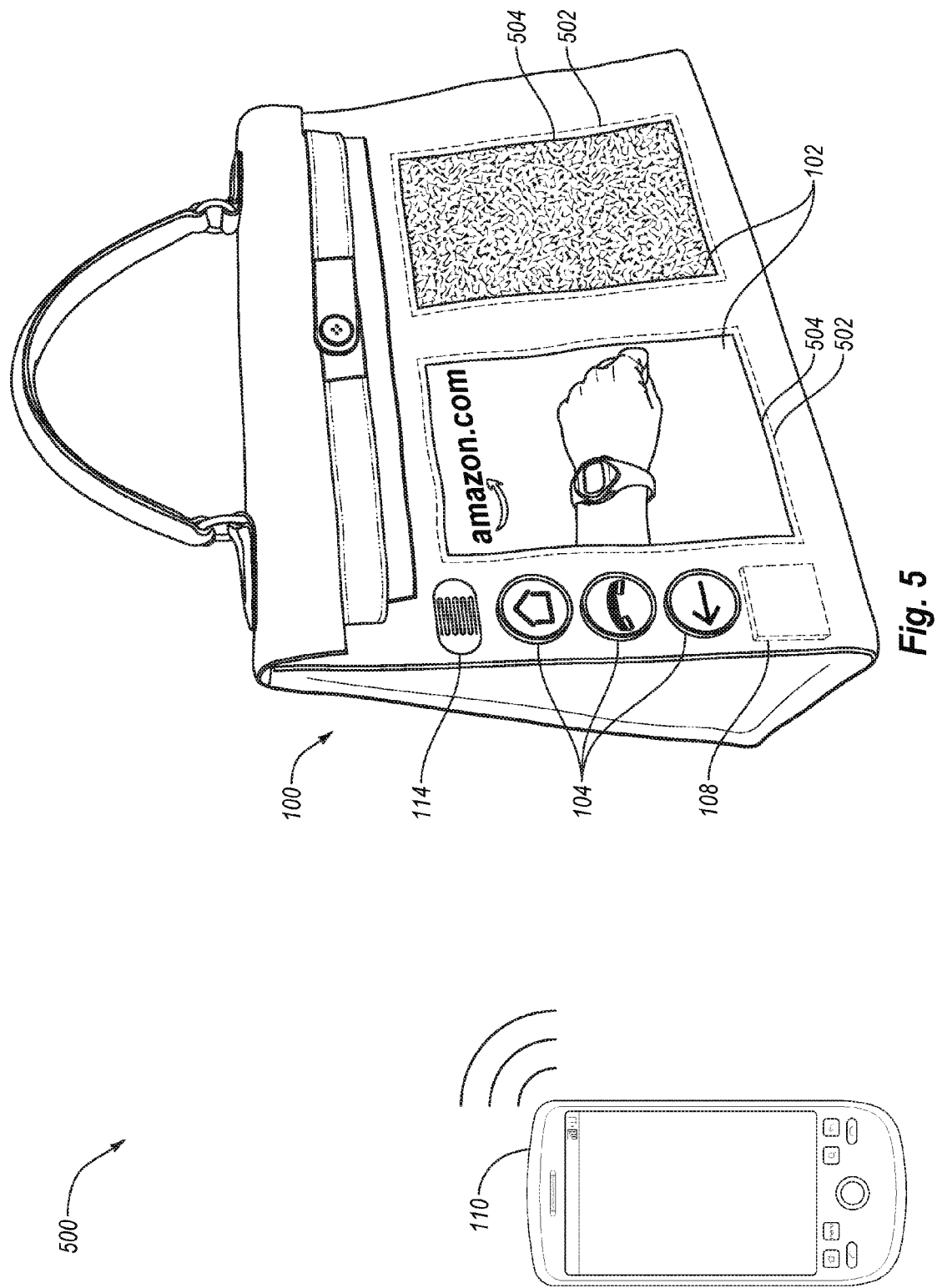

DISPLAY SLEEVES

FIELD

The embodiments discussed herein are related to display sleeves.

BACKGROUND

Wearable technologies may allow users to have consistent visual, tactile, and other constant access to an electronic device. Additionally, wearable technology may allow the user to conveniently store the electronic device without a need for pockets or another means of storage. For example, electronic bracelets, such as a fitness tracking band, may be worn around a wrist of the user while another hand of the user has access to the controls of the bracelets. The user may accordingly view information displayed on the bracelet. Additionally, the user may control or provide input to the bracelet without repeatedly storing and accessing the bracelet or a controlling device linked to the bracelet from a pocket.

Advancements have also been in flexible display and sensing technologies. For example, there have been advancements in light emitting diode (LED), organic light emitting diode (OLED), and electronic paper technologies. The advancements in display technology have made displays made of LED, OLED, and/or electronic paper cheaper, lighter, and flexible in some implementations.

The subject matter claimed herein is not limited to embodiments that operate only in the manners such as those described above. Rather, this background is only provided to illustrate one example area of technology where some embodiments described herein may be practiced.

SUMMARY

An example embodiment includes a garment that includes a panel, a sensor, a flexible display device, and a communication module. The panel includes an outer surface. The sensor is integrated into the garment and configured to collect data. The flexible display device is integrated into the outer surface of the panel. The flexible display device is configured to receive and display data. The communication module is communicatively coupled to the flexible display device, the sensor, and a programmable device and is configured to receive data from the programmable device and sensed data from the sensor and to communicate the received data and the sensed data to the flexible display device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTIONS OF THE DRAWINGS

Example embodiments will be described and explained with additional specificity and detail through the use of the accompanying drawings in which:

FIG. 5 illustrates the display system of FIG. 1 implemented in an example purse, all in accordance with at least one embodiment described herein.

DESCRIPTION OF SOME EXAMPLE EMBODIMENTS

Some embodiments described herein relate to a wearable technology that includes a display system. The wearable technology can be worn and is capable of displaying information drawn from multiple programmable devices and sensors. The wearable technology may be beneficial from a technology and fashion standpoint. For example, in one example embodiment, the wearable technology may include a flexible display device incorporated in an arm sleeve of a user, which may be worn around a wrist. The flexible display device may be used to check emails or text messages or to access information communicated from third parties. The display device may also display images such as team logos or patterns that may shift. Built-in and/or remote sensors can measure physiological conditions of the user. The physiological conditions may also be displayed to the user on the flexible display device. The wearable technology may also use the sensors to respond to changes in the environment and display shifting patterns or colors on the flexible display based upon changes in the environment.

The wearable technology may communicate wirelessly with one or more other devices or the Internet. For example, a user may wirelessly pair a smartphone or a tablet device with the wearable technology, which may allow the user to have access to the content of the smartphone via the wearable technology. The wearable technology incorporating flexible display devices may be used for both function and fashion. For example, the user may have access to the display device which may allow the user to change colors or images on the display device. By changing the colors or images, the wearable technology may give the user a particular desired appearance. The wearable technology may also communicate with other electronic devices of the user. This and some additional embodiments will be explained with reference to the accompanying drawings.

Figure 1:
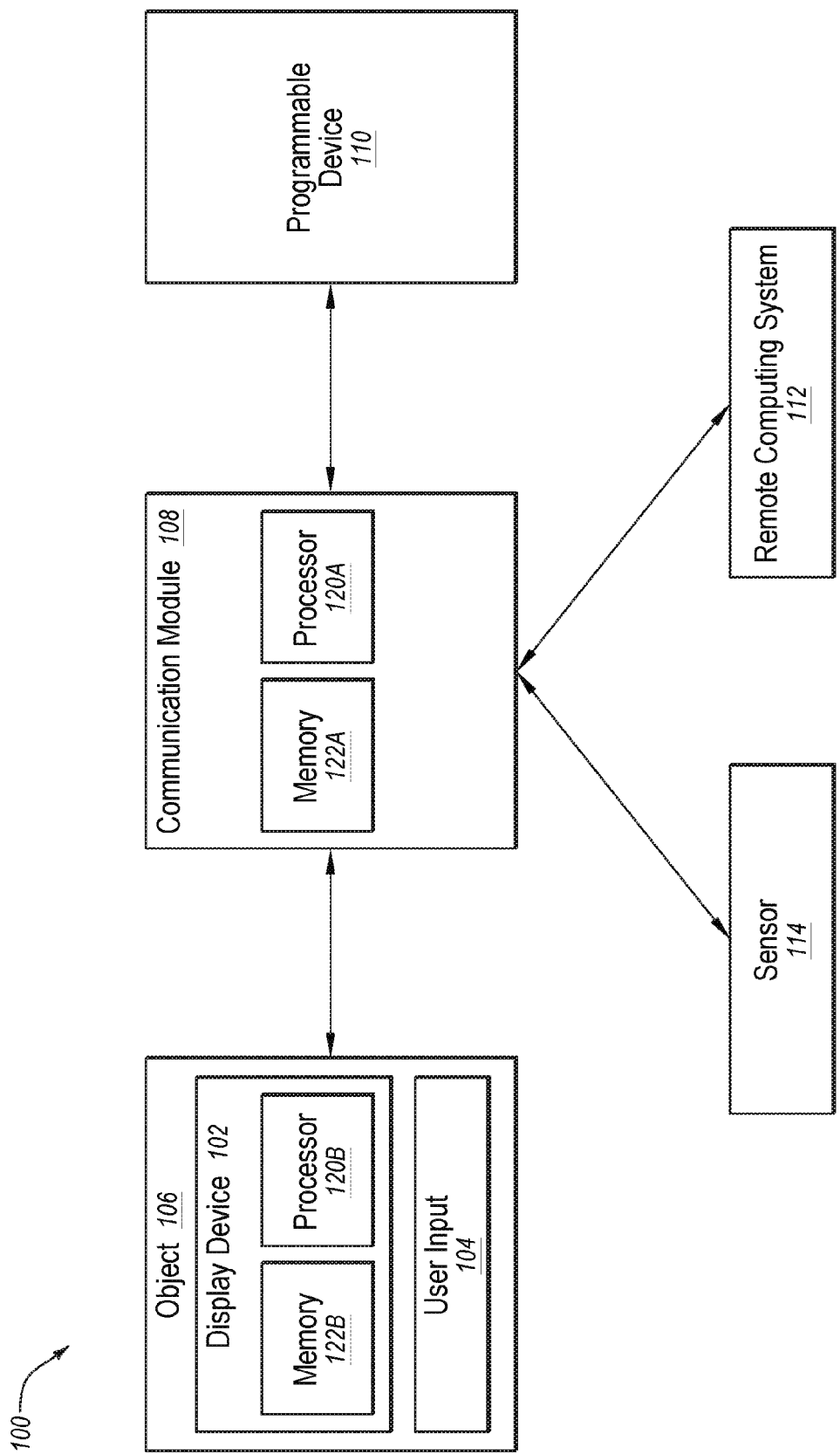
FIG. 1 illustrates a block diagram of an example display system.

FIG. 1 illustrates an example display system, which is generally designated at 100, in accordance with at least one embodiment described herein. Generally, the display system 100 may be integrated into an object 106 such as a garment, accessory, or another suitable object. The display system 100 may be portable and/or light-weight, which may enable integration of the display system 100 into the object 106 without significantly increasing the weight or interfering with a function of the object 106.

Additionally, the display system 100 may be washable, which may further prevent interference with a function of the object 106. For example, one or more components of the display system 100 may be sealed such that water or other cleaning material do not disrupt or damage the components. Particularly in embodiments in which the display device 100 is integrated into a garment or another object 106 that may be routinely or periodically cleaned, the display system 100 or one or more components thereof may be sealed such that the display system 100 may be washed (e.g., in a washing machine) with the garment or the object 106.

The display system 100 may be configured to enable communication between one or more sources, a communication module 108, and a display device 102. In the embodiment depicted in FIG. 1, the sources include a programmable device 110, a remote computing system 112, a sensor 114, and a user input device 104. In some alternative embodiments, the sources may include a subset of the sources of FIG. 1 or include additional, similar devices that may provide data to and/or receive data from the display system 100.

In some embodiments, one or more of the sources may include an existing device. In these and other embodiments, the display system 100 may enable use of the display system 100 with the existing device without requiring the purchase of additional equipment. For example, the display system 100 or some component thereof may include a detection/synching capability that may enable the display system 100 to detect and subsequently synchronize and share data between the display system 100 and one or more of the sources.

The display system 100 may collect data from the sources. The display system 100 may then display at least a portion of the data on a display device 102. One who uses or wears the object 106 and/or those in the proximity of the object 106 may view the data. Additionally, the display system 100 may enable manipulation of the data by the user or another entity, which may be remote to the display system 100.

For example, the user or another entity may edit, modify, or add to the data displayed on the display device 102. Through manipulation of the data by the user or another entity, original data or semi-original data may be created via the display system 100. The original data or the semi-original data may, additionally or alternatively, be displayed on the display device 102 or communicated to one or more of the sources. In circumstances in which the other entity is remote to the display system 100, the other entity may manipulate the data, thereby creating the original data via a communication interface including, created by, and/or supported by the communication module 108.

The display device 102 may include any display or monitor that may be configured to receive data from the communication module 108 and to display at least a portion of the data. For example, the display device 102 may be composed of organic light emitting diodes (OLED), light emitting diodes (LED), electronic paper technologies, or any other suitable material or combination of materials. The display device 102 may also include a display or monitor configured to receive user input such as a touchscreen or stylus-sensitive screen. In some embodiments, the display device 102 may be washable. For example, the display device 102 may be sealed to prevent introduction of water or other cleaning materials into the display device 102.

The display device 102 may be flexible or nonflexible. As used herein, the term "flexible" may refer to a display that is not substantially confined to a planar configuration or to another single configuration (e.g., cylindrical, domed, and the like). For example, a flexible display device 102 may include a capability to be bent or flexed without damaging the display device 102. The term flexible may also include general pliability or bendability as a characteristic of a display device 102. For example, some example embodiments include a display device 102 composed of OLED, which can be flexible. The flexible OLED display device 102 may be wrapped around the object 106 such that the natural curvature or shape of the object 106 is maintained.

Additionally or alternatively, the display device 102 may be integrated into a fabric of the object 106. For example, one or more sections of the display device 102 may be woven with or otherwise integrally formed with a material of the object 106. In some of these embodiments, the fabric itself may provide the display device 102. Additionally or alternatively, the display device 102 may be affixed to the object 106. In some embodiments, the display device 102 may include an array of smaller displays that combine to form the display device 102. Each of the smaller displays in the array may be configured to combine to display the data. For example, the display device 102 may be composed of an array of about 1000 smaller display devices that may be individually integrated with the object 106 and communicatively coupled together. The array may combine to display data.

The display device 102 may display artistic graphical representations or pictures that change or move in an artistic or otherwise pleasing manner. In some embodiments the graphical depictions may include pictures imported by the user, such as favorite personal pictures, a licensed picture, or a licensed graphical representation. The graphical representations may include a logo of a sports team or advertisements for a company, for instance. In other embodiments, the data displayed may include a readout of sensed data collected by the sensor 114, a notification pertaining to the sensed data, or a notification or text of an incoming call, a text message, or an email message. The display device 102 may respond to changes in the physiological/biological state of the user and/or an environment related to or otherwise impacting the user. For example, the data displayed by the display device 102 may change images, lights, or colors based on sensed data collected by the sensor 114. Some additional details of these and other data displayed by the display device 102 are discussed below.

In this and other embodiments, the display system 100 may include the communication module 108. The communication module 108 may be configured to receive the data from the sources. The communication module 108 may then communicate the data, or some portion thereof to the display device 102. The data received from the sources may be displayed on the display device 102. Additionally, the communication module 108 may be configured to communicate original data and/or semi-original data generated using the display system 100 to the sources. In some embodiments, the communication module 108 may be washable. For example, the communication module 108 may be sealed to prevent introduction of water or other cleaning materials into the communication module 108. The communication module 108 may include any system or combination of systems configured to receive data from the sources and communicates the data to the display device 102.

Additionally, the communication module 108 may communicatively couple to the programmable device 110, the remote computing system 112, the sensor 114, the user input device 104, or any combination thereof through a wired connection and/or a wireless connection. Through the connection, the communication module 108 may enable data to be transferred from the communication module 108 to one or more of the programmable device 110, the remote computing system 112, the sensor 114, the user input device 104, or any combination thereof and vice versa. Each of the programmable device 110, the remote computing system 112, the sensor 114, and the user input device 104 are discussed below.

In some embodiments, the communication module 108 includes a port for direct physical connection to a communication network or to another communication channel. For example, the communication module 108 may include a USB, SD, CAT-5, or similar port for wired communication with the components of the display system 100. In some embodiments, the communication module 108 includes a wireless transceiver for exchanging data via communication channels using one or more wireless communication methods, including IEEE 802.11, IEEE 802.16, BLUETOOTH®, or another suitable wireless communication method.

In some embodiments, the communication module 108 includes a cellular communications transceiver for sending and receiving data over a cellular communications network including via SMS, MMS, HTTP, direct data connection, WAP, e-mail, or another suitable type of electronic communication. In some embodiments, the communication module 108 includes a wired port and a wireless transceiver. The communication module 108 may also provide other conventional connections to the network for distribution of files and/or media objects using standard network protocols including transmission control protocol/internet protocol (TCP/IP), HTTP, HTTP secure (HTTPS), and simple mail transfer protocol (SMTP), etc.

For example, the communication module 108 may be communicatively coupled with the display device 102 through a wired connection and/or a wireless connection. The connection (i.e., wired and/or wireless) may enable data to be transferred from the communication module 108 to the display device 102. Additionally or alternatively, the communication module 108 may enable data to be transferred from the display device 102 and/or the user input 104 to one or more of the sources. For example, an operational parameter of the sensor 114 may be input by a user via the user input 104. The communication module 108 may receive the operational parameter and communicate the operational parameter to the sensor 114.

Some examples of the wireless connections may include, but are not limited to, near field communication (NFC), BLUETOOTH®, a wireless fidelity (Wi-Fi) connection, a third generation (3G) wireless connection, a fourth generation (4G) wireless connection, and a long-term evolution (LTE) wireless connection. In some embodiments, the wired connection may include use of a data-transfer cable such as a firewire, a universal serial bus (USB) cable, a micro USB cable, a high definition multi-media interface (HDMI) cable, or any other suitable data-transfer cable.

The communication module 108 may include a processor 120A and memory 122A and/or the display device 102 may include a processor 120B and memory 122B. The processors 120A and 120B included in the communication module 108 and the display device 102, respectively are commonly referred to as the processor(s) 120. Likewise, the memory 122A and 122B included in the communication module 108 and the display device 102, respectively are commonly referred to as the memory 122.

The processor(s) 120 and the memory 122 may be communicatively coupled via a communication bus (not shown) such as a memory bus, a storage interface bus, a bus/interface controller, an interface bus, or the like or any combination thereof. The processor(s) 120 may be configured to execute computer instructions that cause the communication module 108 and/or the display device 102 to perform the functions and operations described herein. The processor(s) 120 may include, but is not limited to, a processor, a microprocessor (µP), a controller, a microcontroller (µC), a central processing unit (CPU), a digital signal processor (DSP), any combination thereof, or other suitable processor.

Computer instructions may be loaded into the memory 122 for execution by the processor(s) 120. In some embodiments, data generated, received, and/or operated on during performance of the functions and operations described herein may be at least temporarily stored in the memory 122. Moreover, the memory 122 may include volatile storage such as RAM. More generally, the communication module 108 and/or the display device 102 may include a non-transitory computer-readable medium such as, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium.

In some embodiments, the communication module 108 may be incorporated into the display device 102. For example, the display device 102 may include a housing that surrounds components of the display device 102 and the communication module 108. In other embodiments the communication module 108 may be incorporated into the object 106. For example, the communication module 108 may be fastened, attached, embedded, integrated into a material of the object 106, or otherwise incorporated into the object 106. In other embodiments the communication module 108 may be separate from the display device 102 and object 106. For example, the communication module 108 may be a separate device or may be incorporated, either in hardware or software, in the programmable device 110 or the sensor 114, for instance.

As stated above, the communication module 108 may communicate data with the programmable device 110 and communicate some portion of the received data to the display device 102. Some examples of the programmable device 110 may include, but are not limited to, a tablet computer, a personal digital assistant (PDA), a smartphone, a portable music player, a mobile computer, a mobile phone, other wearable devices, or another type or category of portable, programmable devices.

For example, the programmable device 110 may include a smart phone. The data communicated from the programmable device 110 may include notifications. The notifications may indicate an incoming call, a text message, a social media notification, a calendar invite or update, an application update, or an email message that is received on the smart phone and communicated to the communication module 108. Additionally or alternatively, the data communicated from the programmable device 110 may include the content of one or more operations occurring on the programmable device 110. For example, the data may include, but is not limited to, the text of an email message, the text of a text message, a photograph included in a message, other data included in messages, information pertaining to a call, the audio of a voicemail and other data provided by the wearable device sensors. The display system 100 may be configured to enable the user to view the data or some portion thereof. The user may respond to the data (e.g., the emails, text messages, and the calls) or set an automated response using the user input 104, for instance.

In another embodiment, the programmable device 110 may include a portable music player. In such an embodiment, the programmable device 110 may be configured to communicate music played on the programmable device 110 through the communication module 108 and to one or more speakers. The speakers may receive the music through a wired or a wireless link. In some embodiments, for instance, the speakers may be integrally formed with the object 106. Alternatively, the programmable device 110 may play the music through speakers that are external to the object 106 such as ear phones or an external wireless (e.g., BLUETOOTH®) speaker. Additionally, the programmable device 110 may communicate information about a song being played to the communication module 108, which may then communicate the information to the display device 102. A user may view the information pertaining to the song. Additionally or alternatively, the display device 102 may show changing patterns and colors in sync with the music, the display device 102 may display a music video, or some combination thereof. Additionally, the user may also change the song, the volume of the song, or another parameter of the music on the portable music using the user input 104 and/or the display device 102.

The communication module 108 may additionally or alternatively communicatively couple with the sensor 114. The sensor 114 communicates sensed data from the sensor 114 to the communication module 108, which in turn communicates the sensed data to the display device 102 or processes the sensed data as described herein. In some embodiments, the communication from the sensors 114 to the display device 102 may occur in substantially real-time. Substantially real-time may include an insignificant time delay. The sensor 114 may include, but is not limited to, a global positioning system (GPS) receiver, a heart rate monitor, a pedometer, a calorie counter, a VO2 max sensor, a biosensor, an accelerometer, a camera, a video camera, a light sensor, a microphone, a galvanic skin response sensor, a hydration monitor, thermometer, and a blood pressure sensor. The sensors 114 may also measure any external environmental factor such as temperature, light, barometric pressure, humidity, altitude, air quality, pollen count, air-particulate count, and the like.

The sensor 114 may be used to gather information relevant to an athlete for training purposes. Additionally or alternatively, the sensors 114 may be used for the purpose of displaying lights, colors, or patterns that change based on an increase or decrease of one of the values measured or based on a difference between two or more of the values. The user may also use the user input 104 to turn the sensor 114 on or off or to adjust the sensitivity of the sensor 114.

In some embodiments, the sensor 114 may include a camera configured to capture an image of the environment of the display system 100. The communication module 108 may receive the captured image and communicate the captured image to the display device 102 where the captured image may be displayed. Similarly, in some embodiments, the sensor 114 may include a video camera. The video camera may generate video images of an environment of the display system 100. The video image may be communicated to the communication module 108 and then to the display device 102 where the video image is displayed. The video image and/or the captured image may be displayed and/or updated in substantially real-time.

In some embodiments, the sensor 114 may be configured with the one or more of the processors 120 to generate notifications based on sensed data received from the sensors 114. The notifications may be specifically related to a nature of the sensor 114. For example, the sensor 114 may include a biosensor or an environmental sensor. Accordingly, the notification may include a notice regarding a need for a medication, a need to modify surrounding environmental conditions (e.g., move inside to avoid an environment having a high pollen count), or another physical and environmental data.

The communication module 108 may also communicate with the remote computing system 112. The remote computing system 112 may include one or more computing devices that may be substantially similar to and/or correspond with the programmable device 110 described above. Additionally, the remote computing system 112 may include one or more hardware servers, for instance.

The remote computing system 112 may belong to or be otherwise associated with a second entity. The second entity may be separate from the user, such as another person, an enterprise, or another entity hosting a server. The remote computing system 112 may communicate with the communication module 108 via the Internet, or any other suitable communication network.

In some embodiments, the display system 110 may communicate with the remote computing system 112 via a secured communication link. The secured communication link may be established via a virtual private network (VPN) or an equivalent link.

For example, a remote computing system 112 may be controlled by a coach. To communicate plays to her players during games or practice, the coach may communicate data to the communication module 108. In other embodiments the remote computing system 112 may be integrated into buildings or areas to notify a user via the display device 102 that the user has entered the building or an area of the building. Such notifications may include practical information about a restaurant or retail store or aesthetic displays such as changing lights and colors while entering a nightclub or sports arena. Additionally or alternatively, the remote computing system 112 may include display devices or other computing devices linked to other users. In these and other embodiments, the remote computing system 112 may communicate data indicating status of social media relationships and/or locational data. Accordingly, the display device 100 may generate notifications which may include notice of the proximity of networked social media contacts. Additionally or alternatively, the remote computing system 112 may be linked to a healthcare provider that may communicate information to the display system 100 in the form of notifications.

A user may respond to notifications generated from data communicated from the sensors 114 and/or the remote computing system 112 via the user input 104, for instance. From the above examples, the user may include a player who may respond to a coach, a diner at a restaurant who may choose a food item from a menu communicated from the restaurant, a patient who may respond to a health-related or environmental-related notification, or a user who may communicate a message with a social media contact.

In some embodiments, the remote computing system 112 may include the Internet. A user of the display device 100 may access the Internet via the communication module 108. Additionally or alternatively, the user may operate the user input 104 to access the Internet. The user may accordingly conduct commercial internet transactions, search for internet webpages, view websites or webpages, or any other similar internet activity.

As mentioned above, the user input 104 may enable a user of the display system 100 to interact with the data displayed on the display device 102. For instance, the user input 104 may enable the user to modify, to respond to, or to select from the data displayed on the display device 102. The user input 104 may include, but is not limited to, physical buttons, a touch screen coupled with or integrated into the display device 102, or an audio receiver such as a microphone.

Additionally, in some embodiments there may be some overlap between the user input 104 and the sensor 114. For example, the sensor 114 may include a weather sensor. When the sensor 114 senses that it is raining, the sensor 114 may communicate a signal to the programmable device 110 to alter a running map displayed on the display device 102. Accordingly, user input may be generated and communicated directly from the sensor 114 to the programmable device 110 rather than the user generating the signal.

The user input 104 may also be coupled with a graphical user interface (GUI) which may be displayed on the display device 102 and interacted with through the user input 104. The GUI may be incorporated with a user interface system developed to operate with the display system 100. The user interface may also allow the user to customize the display for functional or aesthetic purposes. For example, the user interface may allow a user to change a color of the display device 102 or optimize the settings for increased battery life.

With the user input 104, the display system 100 may act with a portable electronic device. For example, the user input 104 may allow the user to transfer input to and/or control the sensor 114, the remote computing system 112, and the programmable device 110 through the communication module 108. In some embodiments, the user input 104 may be used to alternate between different sources connected to the display system 100. For example, the display device 102 may be changed from data communicated from the sensor 114 to data communicated from the programmable device 110. Additionally or alternatively, the user input 104 may also allow a user to communicate with a second entity associated with the remote computing system 112. For example, the second entity may include a coach or a networked social media contact or healthcare provider. The user input 104 may enable a player operating the display system 100 to respond to an instruction of the coach, for instance. Additionally, the second entity may include a hosting server that hosts a social website. The user input 104 may allow a user of the display system 100 to post a notification on the social website. For example, the user may post a notification that she is entering a restaurant.

Modifications, additions, or omissions may be made to the display system 100 without departing from the scope of the present disclosure. Specifically, embodiments depicted in FIG. 1 include one object 106, one display device 102, one user input 104, one communication module 108, one sensor 114, one remote computing system 112, and one programmable device 110. However, the present disclosure applies to a display system architecture having multiple objects 106, multiple display devices 102, multiple user inputs 104, multiple communication modules 108, multiple sensors 114, multiple remote computing systems 112, multiple programmable devices 110, or any combination thereof. Moreover, the separation of various components in the embodiments described herein is not meant to indicate that the separation occurs in all embodiments. Moreover, it may be understood with the benefit of this disclosure that the described components may be integrated together in a single component or separated into multiple components.

The display system 100 may be incorporated into the object 106 such as a garment, accessory, or any other suitable object. The object 106 may be composed of a fabric, a plastic, leather or any other suitable material. The object 106 may house the display device 102 and/or the user input 104 as shown in FIG. 1. Additionally or alternatively, in some embodiments, the object 106 may house the communication module 108 and/or the sensor 114. The object 106 may be worn as a garment, carried as an accessory, or exist as its own device. FIGS. 2-5 illustrate some examples of the object 106 incorporating one or more components (e.g., 102, 104, 108, 114, 110) of the display system 100. The display system 100 may be incorporated into the object 106 to provide a fusion of fashion and technology. Additionally, the display system 100 may provide users with easily accessible and viewable data.

Figure 2:
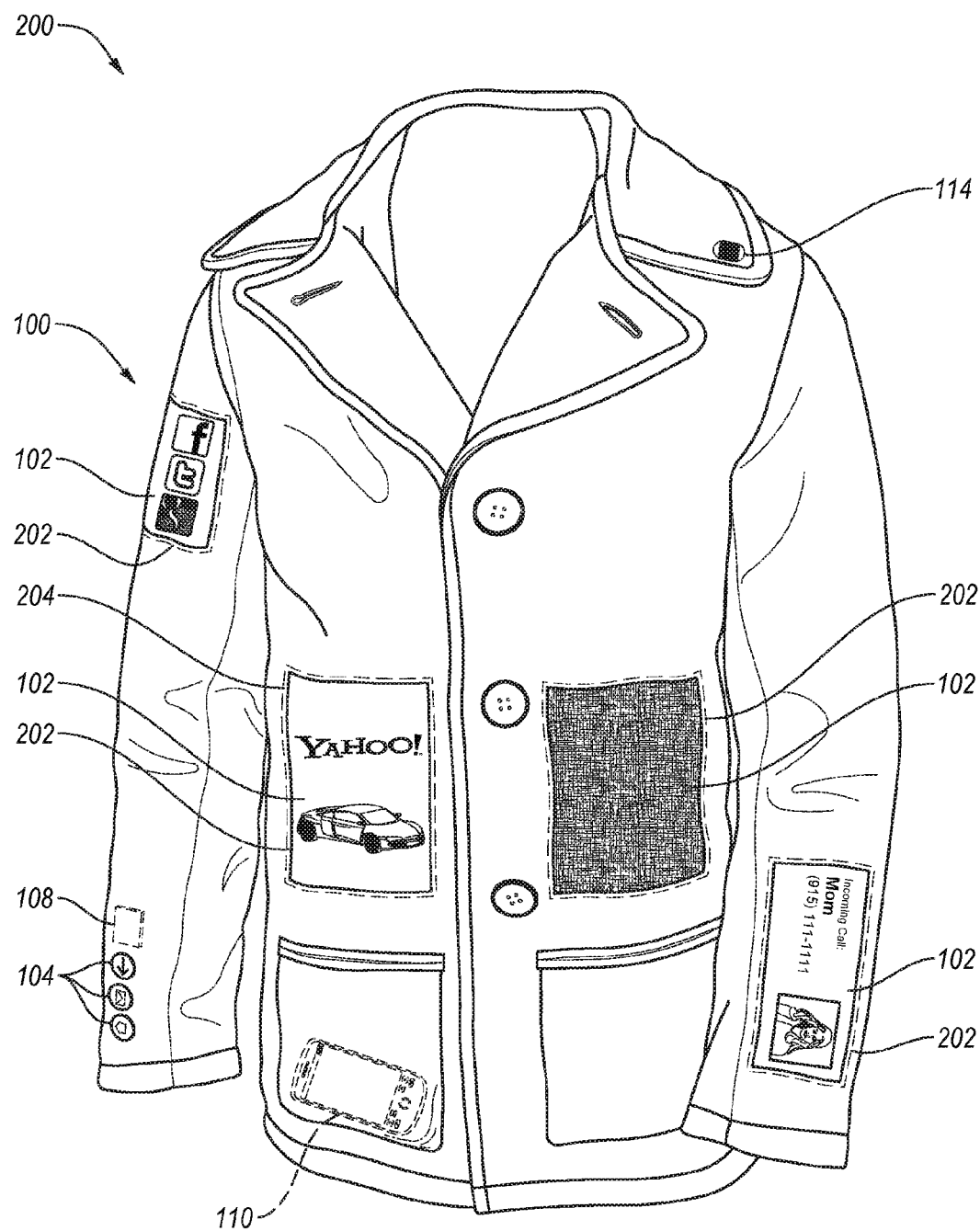
FIG. 2 illustrates the display system of FIG. 1 implemented in an example coat.

FIG. 2 is an example coat, which is generally denoted at 200, implementing the display system 100 and one or more sources of FIG. 1. The coat 200 may include one or more panels 202. The panels 202 generally designate portions of the coat 200 that may be used in the implementation of the display system 100, and particularly the display device 102 included therein.

In the depicted embodiment of the coat 200, the panels 202 are substantially rectangular and included on a front of the coat 200. This however is not meant to be limiting. In some embodiments, the panels 202 may include other shapes such as triangles, circles, or any other suitable shape. Additionally, the coat 200 may include one or more panels 202 located on a back of the coat 200, along a top-shoulder portion of the coat 200, on an interior of the coat 200, or any combination thereof. Selection of the shapes and/or locations the panels 202 may be based on the overall shape of the coat 200, the function performed by the display system 100, aesthetics, or some combination thereof.

The panels 202 may each include an outer surface 204. The outer surface 204 generally includes a surface of the panel 202 that is viewable and/or accessible by a user. The outer surface 204 of one of the panels 202 is labeled in FIG. 2, however it may be appreciated with the benefit of this disclosure that each of the panels 202 may include the outer surface 204.

To integrate the display system 100 of FIG. 1 into the coat 200, the flexible display device 102 may be integrated into one or more of the panels 202. For example, the display may be integrated into the fiber of the panel 202, the display device 102 may be affixed to the panel 202, the display device 102 may be partitioned and one or more portions of the display device 102 may be affixed to the panel 202, the display device 102 may be inserted into a pocket created on the panel 202, or another suitable means of the integrating the display device 102 into the panel 202.

Additionally, one or more of the communication module 108, the user input 104, and the sensor 114 may be incorporated in the coat 200. In the depicted coat 200, for instance, the sensor 114 may include a temperature sensor incorporated in a collar portion of the coat 200. The sensor 114 may communicate with a communication module 108, which may be sewn into, affixed, or otherwise incorporated into a sleeve of the coat 200. Additionally, the programmable device 110 may be placed in a pocket of the coat 200 and a user input 104 may be incorporated into the sleeve.

Additionally or alternatively, the sensor 114 may include a video camera. The video camera may generate a video image of an environment of the coat 200. The video image may be communicated to the communication module 108 and then to the display device 102 where the video image is displayed. The video image may be displayed in substantially real-time.

The display system 100 implemented in the coat 200 may have one or more functionalities. For example, functionalities of the display system 100 may include but not are limited to displaying a color, which may be customizable and/or changing; displaying a pattern, which may be customizable and/or changing; displaying data from physiological or environmental sensors 114; visual notifications of incoming calls, text messages or emails from the programmable device 110; displaying logos, which may be customizable and/or changing; displaying graphical representations; displaying the proximity or location of networked social network contacts (persons or entities); displaying notifications from remote computing systems 112; or any combination thereof. For example, one of the flexible display devices 102 in FIG. 2 displays a logo for YAHOO® along the front of the coat 200. Additionally, one of the flexible display devices 102 in FIG. 2 displays a pattern. On the sleeve, one of the flexible display devices 102 displays an incoming call, which may be communicated from the programmable device 110. On another display device 102, connections to one or more social media websites. Specifically in the depicted embodiment, the display device 102 may connect a user to TWITTER®, INSTAGRAM®, LINKEDIN®, FACEBOOK®, GOOGLE+® or other third-party social networking communities.

The display system 100 implemented in the coat 200 may be washable. For example, a user may not have to remove the flexible device 102 or another components of the display system 100 prior to washing the coat 200. In some embodiments, the panels 202 may be water-tight and/or the components of the display system 100 may be sealed to prevent introduction of water or other cleaning materials to the components.

Figure 3:
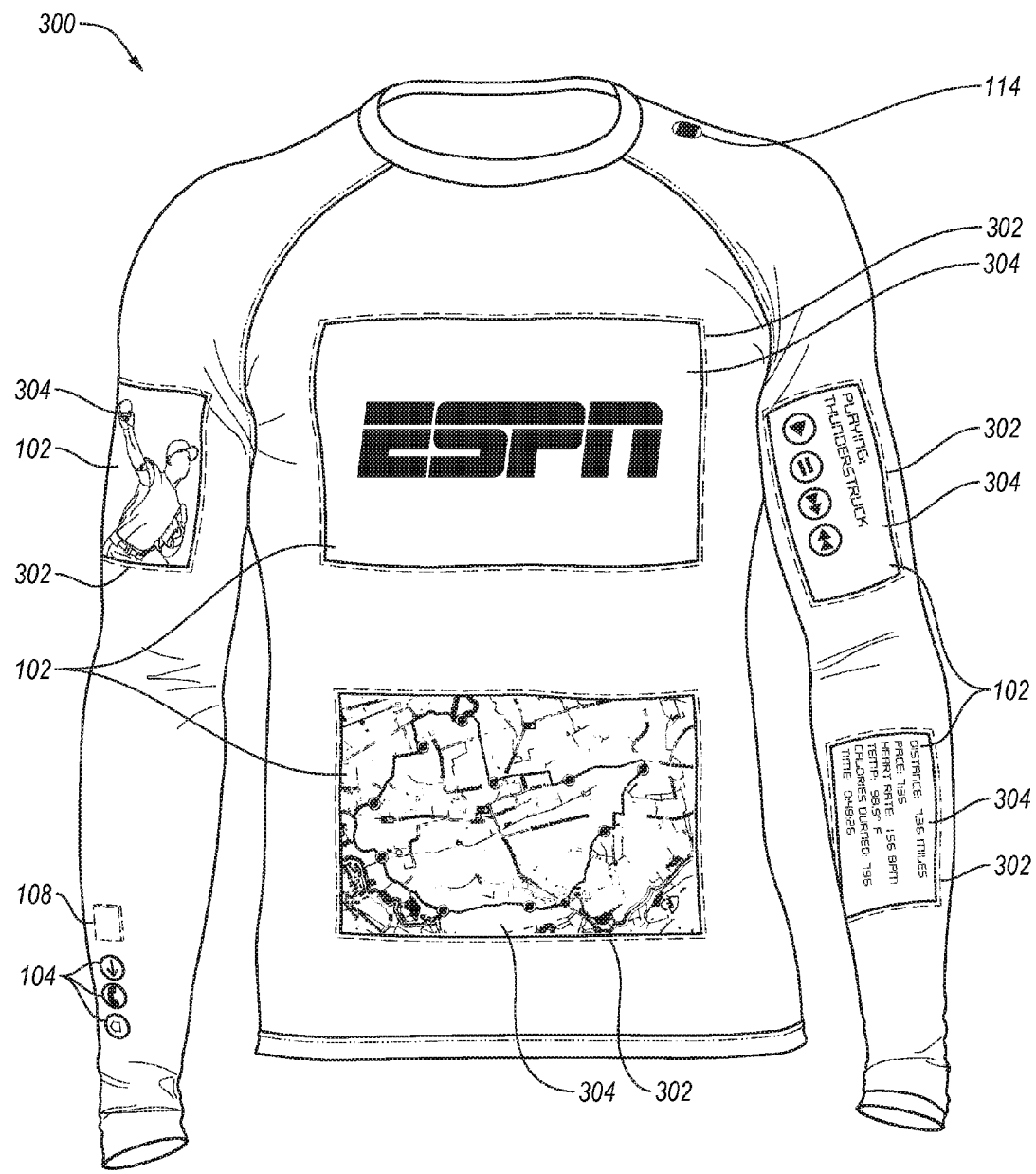
FIG. 3 illustrates the display system of FIG. 1 implemented in an example shirt.

FIG. 3 is an example shirt, which is generally denoted at 300, implementing the display system 100 of FIG. 1. The shirt 300 may include one or more panels 302. The panels 302 generally designate portions of the shirt 300 that may be used in the implementation of the display system 100, and particularly the display device 102 included therein.

In the depicted shirt 300, the panels 302 are substantially rectangular and included on a front of the shirt 300 and the sleeves of the shirt. This however is not meant to be limiting. In some alternative embodiments, the panels 302 may include other shapes such as triangles, circles, or any other suitable shape. Additionally, the shirt 300 may include one or more panels 302 located on a back of the shirt 300, along a top-shoulder portion of the shirt 300, on an interior of the shirt 300, or any combination thereof. Selection of the shapes and/or locations of the panels 302 may be based on the overall shape of the shirt 300, the function performed by the display system 100, aesthetics, or some combination thereof.

The panels 302 may each include an outer surface 304. The outer surface 204 generally includes a surface of the panel 302 that is viewable or accessible by a user. To integrate the display system 100 of FIG. 1 into the shirt 300, the flexible display device 102 may be integrated into one or more of the panels 302 as discussed with reference to FIGS. 1 and 2.

Additionally, one or more of the communication module 108, the user input 104, and the sensor 114 may be incorporated in the shirt 300. In the depicted shirt 300, for instance, the sensor 114 may include a temperature sensor incorporated in a shoulder portion of the shirt 300. The sensor 114 may communicate with a communication module 108, which may be sewn into, affixed, or otherwise incorporated into a sleeve of the shirt 300. Additionally, the programmable device 110 of FIGS. 1 and 2 may be placed in a pocket of the shirt 300 or in another garment of a user. Additionally, the user input 104 may be incorporated in the sleeve.

The display system 100 implemented in the shirt 300 may have one or more functionalities. For example, the functionalities of the display system 100 may include but are not limited to displaying a color, which may be customizable and/or changing; displaying a pattern, which may be customizable and/or changing; displaying a data from physiological or environmental sensors 114; visual notifications of incoming calls, text messages or emails from the programmable device 110; displaying logos, which may be customizable and/or changing; displaying graphical representations, or any combination thereof. For example, one of the flexible display devices 102 in FIG. 3 displays a logo for ESPN® on the front of the shirt 300. Additionally, one of the flexible display devices 102 in FIG. 3 displays a map. On the sleeve, one of the flexible display devices 102 displays a music control, another displays an incoming text message, and another displays a baseball player.

The display system 100 implemented in the shirt 300 may be washable. For example, a user may not have to remove the flexible device 102 or another other components of the display system 100 prior to washing the shirt 300. As with the coat 200 of FIG. 2, the panels 302 may be water-tight and/or the components of the display system 100 may be sealed to prevent introduction of water or other cleaning materials to the components.

Figure 4:
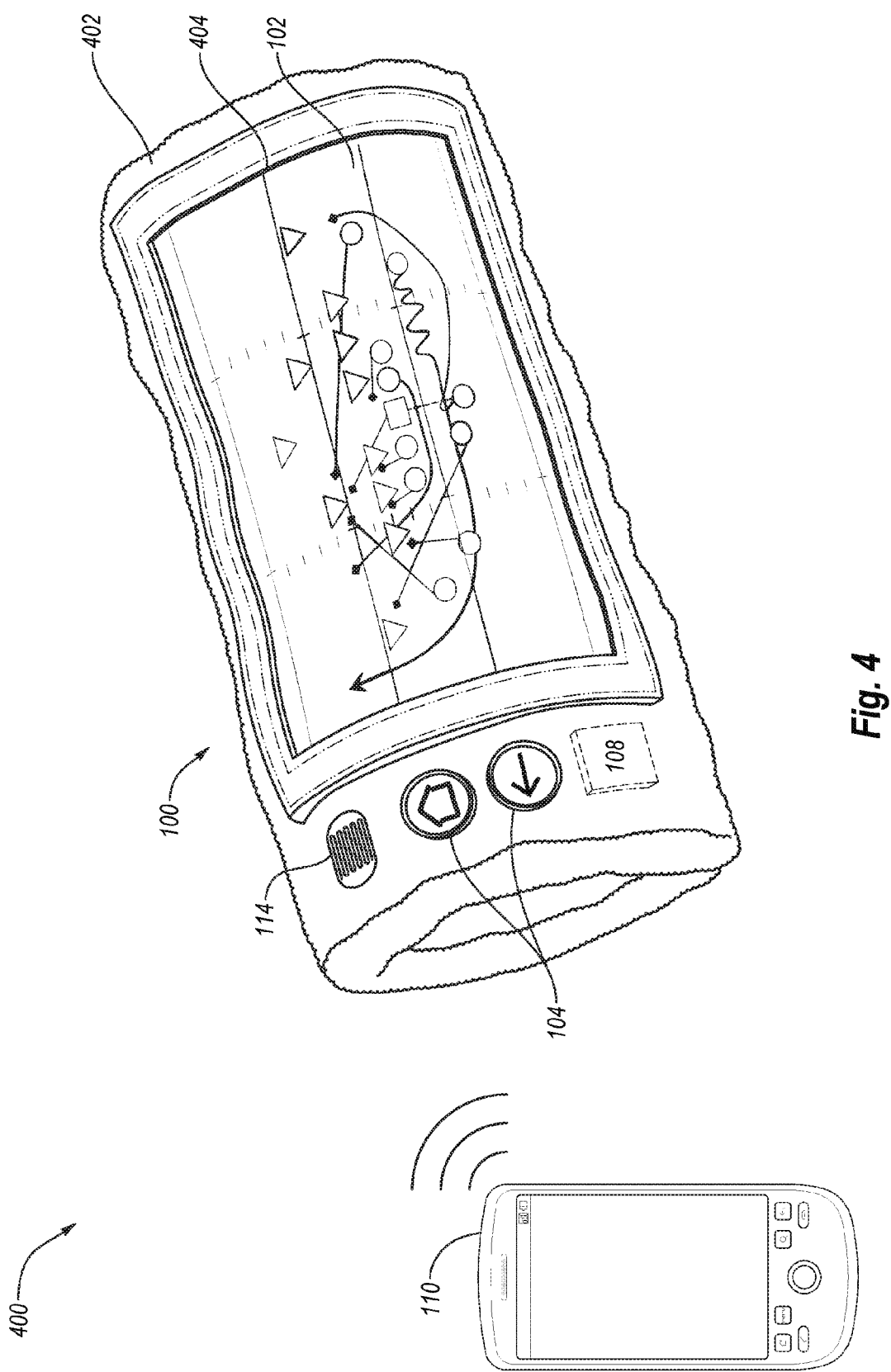
FIG. 4 illustrates the display system of FIG. 1 implemented in an example display sleeve.

FIG. 4 is an example display sleeve (sleeve), which is generally denoted at 400, implementing the display system 100 of FIG. 1. The sleeve 400 may include a panel 402. The panel 402 generally designates a portion of the sleeve 400 that may be used in the implementation of the display system 100, and particularly the display device 102 included therein.

In the depicted sleeve 400, the panel 402 is at least partially circumferentially wrapped around the sleeve 400. This configuration of the panel 402 is not meant to be limiting. The sleeve 400 may include one or more panels 402 located on an interior of the sleeve 400, for example. Selection of the location(s) of the panel 402 may be based on the overall shape of the sleeve 400, the function performed by the display system 100, aesthetics, or some combination thereof.

The panel 402 may include an outer surface 404. The outer surface 404 generally includes a surface of the panel 402 that is viewable or accessible by a user. To integrate the display system 100 of FIG. 1 into the sleeve 400, the flexible display device 102 may be integrated into the panel 402 as discussed with reference to FIGS. 1 and 2.

Additionally, one or more of the communication module 108, the user input 104, and the sensor 114 may be incorporated in the sleeve 400. The programmable device 110 of FIGS. 1 and 2 and/or the remote computing system 122 of FIG. 1 may be located externally to the sleeve 400. For example, the programmable device 110 may be placed in a compartment (not shown) of the sleeve 400 or another garment worn by a user. The user input 104 may be incorporated into the sleeve 400. For example, the user input 104 may include one or more buttons (as shown) that selects data to be displayed on the display device 102.

The display system 100 implemented in the sleeve 400 may have one or more functionalities. For example, functionalities of the display system 100 may include but not are limited to displaying a color, which may be customizable and/or changing; displaying a pattern, which may be customizable and/or changing; displaying a data from physiological or environmental sensors 114; visual notifications of incoming calls, text messages or emails from the programmable device 110; displaying logos, which may be customizable and/or changing; displaying graphical representations, or any combination thereof. For example, in the depicted embodiment of the sleeve 400, a depiction of a football play is displayed on the display device 102. Similar to the shirt 300 and the coat 200, the display system 100 implemented in the sleeve 400 may be washable.

FIG. 5 is an example purse, which is generally denoted at 500, implementing the display system 100 of FIG. 1. The purse 500 may include one or more panels 502. The panels 502 generally designate portions of the purse 500 that may be used in the implementation of the display system 100, and particularly the display device 102 included therein.

In the depicted purse 500, the panels 502 are substantially rectangular and included on a front of the purse 500. However, this is not meant to be limiting. In some alternative embodiments, the panels 502 may include other shapes such as triangles, circles, or any other suitable shape. Additionally, the purse 500 may include one or more panels 502 located on a back of the purse 500, along a top portion of the purse 500, on an interior of the purse 500, or any combination thereof. Selection of the shapes and/or locations of the panels 502 may be based on the overall shape of the purse 500, the function performed by the display system 100, aesthetics, or some combination thereof.

The panels 502 may each include an outer surface 504. The outer surface 504 generally includes a surface of the panel 502 that is viewable or accessible by a user. To integrate the display system 100 of FIG. 1 into the purse 500, the flexible display device 102 may be integrated into one or more of the panels 502 as discussed with reference to FIGS. 1 and 2.

Additionally, one or more of the communication module 108, the user input 104, and the sensor 114 may be incorporated in the purse 500. In the depicted purse 500, for instance, the sensor 114 may include a light sensor incorporated in a side portion of the purse 500. The sensor 114 may communicate with a communication module 108, which may be sewn into, affixed, or otherwise incorporated in the purse 500. Additionally, the programmable device 110 and/or the remote computing system 122 (not shown) of FIG. 1 may be placed in a pocket of the purse 500 or another garment of a user.

Alternatively, the sensor 114 may include a camera that captures an image of the environment of the purse 500. The communication module 108 may receive the captured image and communicate the captured image to one or more of the display devices 102 where the captured images may be displayed.

The display system 100 implemented in the purse 500 may have one or more functionalities. For example, the functionalities of the display system 100 may include but are not limited to displaying a color, which may be customizable and/or changing; displaying a pattern, which may be customizable and/or changing; displaying a data from physiological or environmental sensors 114; visual notifications of incoming calls, text messages or emails from the programmable device 110; displaying logos, which may be customizable and/or changing; displaying graphical representations, or any combination thereof. For example, one of the flexible display devices 102 in FIG. 5 displays an advertisement for a watch from AMAZON.COM® on the front of the purse 500. Additionally, one of the flexible display devices 102 in FIG. 3 displays a design. The design may change based on the light measured by the sensor 114, for instance. Similar to the shirt 300 and the coat 200, the display system 100 implemented in the purse 500 may be washable.

All the examples and language used herein are intended to aid the reader in understanding the invention and the concepts contributed by the inventor to further the art. These examples should not be construed as a limitation to the specifically described example embodiments and conditions. Although the embodiments are described in detail, it should be understood that various changes or omissions might be made without departing from the spirit or scope of the invention. It should also be understood that the numerous examples of different garments may include any combination of components, features, and systems as described above in any combination.

What is claimed is:

1. A sleeve-based display system that is configured to enable communication between a player and a coach in real-time, the sleeve-based display system comprising:
   a display sleeve including an outer surface, a panel, and a display system, wherein the panel is circumferentially wrapped around the outer surface, the display system is implemented using the panel, and the display system includes:
   a flexible organic light emitting diode (OLED) display device implemented on an outer surface of the panel such that the flexible OLED display device is viewable and accessible by the player with the display sleeve worn on an arm of the player, wherein the flexible OLED display device is configured to receive and to display data and to receive user input and communicate a signal representative of the user input;
   an environmental sensor that is incorporated in the display sleeve, wherein the environmental sensor is configured to collect in real-time data pertaining to a location of the player in an environment in which the player is positioned while wearing the display sleeve and an environmental condition in the environment;
   physiological sensors that are incorporated into the outer surface of the display sleeve, wherein the physiological sensors are configured to measure in real-time a heart rate of the player, steps taken by the player, a physiological state of the player, a galvanic skin response of the player, a hydration level of the player, a player temperature, a blood pressure of the player, and a V02 max rate of the player;
   a user input device that is incorporated in the display sleeve, wherein the user input device is configured to receive user input from the player to control the environmental sensor and the physiological sensors, to respond to data displayed on the flexible OLED device, and the user input device is further configured to communicate a signal representative of the received user input;
   a communication module that is incorporated in the display sleeve, wherein the communication module is configured to receive data from two or more external sources and to communicate the received data to the flexible OLED display device, and the communication module is further configured to receive data from the user input device, the physiological sensors, the environmental sensor, and the flexible OLED display device and to communicate the data to the two or more external sources;
   a programmable device that is located externally to the display sleeve, wherein the programmable device is configured to be selectively stored in a compartment of the display sleeve and the programmable device is configured to receive data from a website and communicate the data from the website to the communication device; and
   a remote computing system located externally to the display sleeve, wherein the remote computing system is associated with the coach and is configured to receive input from the coach and to wirelessly communicate the input to the communication module, wherein:

the measured heart rate, the measured steps, the measured physiological state, the measured galvanic skin response, the measured hydration level, the measured player temperature, the measured blood pressure, and the measured V02 max rate are wirelessly communicated to the communication module and further wirelessly communicated to the remote computing system for view by the coach;

the measured environmental condition and the location of the player is wirelessly communicated to the communication module and the remote computing system for view by the coach;

in response to receipt of the measured heart rate, the measured steps, the measured physiological state, the measured galvanic skin response, the measured hydration level, the measured player temperature, the measured blood pressure, the measured environmental condition, and the measured V02 max, the communication module is configured to generate a notification based of a need to modify a surrounding environment due to the measured environmental condition and to wirelessly communicate the notification to the flexible OLED display device;

the flexible OLED display device is configured to display the notification and to alter data displayed thereon in response to alternative data received from the programmable device;

the flexible OLED display device is further configured to display the measured sensor data in substantially real-time;

the communication module is further configured to wirelessly communicate data with a remote computing system using a secured communication link; and the flexible OLED display device, the environmental sensor, the physiological sensors, and the programmable device are configured to be controlled by the data received from the remote computing system.

2. The sleeve-based display system of claim 1, wherein the flexible OLED display device, the environmental sensor, the physiological sensors, the user input device, and the communication module are sealed such that water does not damage the flexible OLED display device, the environmental sensor, the physiological sensors, the user input device, and the communication module.

3. The sleeve-based display system of claim 2, wherein:

the remote computing system is a first remote computing system of a plurality of remote computing system;

the communication module is configured to receive a notification from the first remote computing system in response to the player being within a proximity of the first remote computing system;

in response to the received notification from the first remote computing system, communicate the received notification to the flexible OLED display device for display thereon;

receive input from the player via the user input device; and in response to the input, communicate a message to a second remote computing system of the plurality of remote computing system, the message indicating entry of the player into the proximity of the first remote computing system.

4. The sleeve-based display system of claim 3, wherein the user input device includes one or more of a selectable button, a touch screen, and an audio receiver.

5. The sleeve-based display system of claim 3, wherein the communication module is configured to support:

a first wired connection configured to communicatively couple with the programmable device and a second wired connection configured to communicatively couple with the flexible display device;

a first wireless connection configured to communicatively couple with the programmable device and the second wired connection configured to communicatively couple with the flexible display device;

the first wired connection configured to communicatively couple with the programmable device and a second wireless connection configured to communicatively couple with the flexible display device; or a first wireless connection configured to communicatively couple with the programmable device and the second wireless connection configured to communicatively couple with the flexible display device.

6. The sleeve-based display system of claim 5, wherein the first wireless connection and/or the second wireless connection includes one or more of a near field communication (NFC) connection, a BLUETOOTH® connection, a Wi-Fi connection, a third generation (3G) connection, a fourth generation (4G) connection, and a long-term evolution (LTE) connection.

7. The sleeve-based display system of claim 6, wherein:

the environmental sensor includes a video camera configured to capture a video image of the environment;

the communication module is configured to receive the video image and communicate the video image to the flexible OLED display device; and the flexible OLED display device is configured to display the video image in real time.

8. The sleeve-based display system of claim 7, wherein:

in response to receipt of the measured heart rate, the measured steps, the measured physiological state, the measured galvanic skin response, the measured hydration level, the measured player temperature, the measured blood pressure, the measured environmental condition, and the measured V02 max, the communication module is configured to generate and to communicate a notification to the flexible OLED display device including a notice regarding a need for a medication.

9. The sleeve-based display system of claim 7, wherein the environmental sensor includes a camera, a video camera, a global positioning system (GPS) receiver, an accelerometer, a light sensor, a microphone, a thermometer, a barometric pressure sensor, a humidity sensor, an altimeter, an air quality sensor, pollen count sensor, and an air particulate counter.

10. The sleeve-based display system of claim 9, wherein a remote computing system is configured to communicate one or more or a combination of:

data related to removable art;

data related to an advertisement;

data related to temporary and changing logos; and data related to artistic patterns.

11. The sleeve-based display system of claim 1, further comprising a speaker that is communicatively coupled to the communication module, wherein:

the communication module is further configured to receive data from the programmable device and/or the remote computing system;

the received data includes data related to display of colors and patterns on the flexible display device;
the received data further includes audio data; and
the flexible display device is configured to synchronize changes in display of the colors and patterns with music played by the speakers based on the audio data.

12. The sleeve-based display system of claim 1, wherein the communication module is incorporated into at least one of the environmental sensor, the physiological sensors, and the flexible OLED display device.

13. The sleeve-based display system of claim 1, wherein the environmental condition includes one or more or a combination of an environmental temperature, a light, a sound, a barometric pressure, a humidity, an altitude, an air quality, a pollen count, and an air particulate count.

14. A display sleeve comprising:
an outer surface;
a panel circumferentially wrapped around the outer surface; and
a display system implemented using the panel, wherein the display system includes:
a flexible organic light emitting diode (OLED) display device implemented on an outer surface of the panel such that the flexible OLED display device is viewable and accessible by a player with the display sleeve worn on an arm of the player, wherein the flexible OLED display device is configured to receive and to display data and to receive user input and communicate a signal representative of the user input;
an environmental sensor that is incorporated in the display sleeve, wherein the environmental sensor is configured to collect in real-time data pertaining to a location of the player in an environment in which the player is positioned while wearing the display sleeve and an environmental condition in the environment;
physiological sensors that are incorporated into the outer surface of the display sleeve, wherein the physiological sensors are configured to measure in real-time a heart rate of the player, steps taken by the player, a physiological state of the player, a galvanic skin response of the player, a hydration level of the player, a player temperature, a blood pressure of the player, and a V02 max rate of the player;
a user input device that is incorporated in the display sleeve, wherein the user input device is configured to receive user input from the player to control the environmental sensor and the physiological sensors, to respond to data displayed on the flexible OLED device, and the user input device is further configured to communicate a signal representative of the received user input;
a communication module that is incorporated in the display sleeve, wherein the communication module is configured to receive data from a programmable device that is located externally to the display sleeve and a remote computing system and to communicate the received data to the flexible OLED display device, and the communication module is further configured to receive data from the user input device, the physiological sensors, the environmental sensor, and the flexible OLED display device and to communicate the data to the programmable device or the remote computing system; and
a compartment configured to store the programmable device;
wherein:

the measured heart rate, the measured steps, the measured physiological state, the measured galvanic skin response, the measured hydration level, the measured player temperature, the measured blood pressure, and the measured V02 max rate are wirelessly communicated to the communication module and further wirelessly communicated to the remote computing system for view by a coach associated with the remote computing system;

the measured environmental condition and the location of the player is wirelessly communicated to the communication module and the remote computing system for view by the coach;

in response to receipt of the measured heart rate, the measured steps, the measured physiological state, the measured galvanic skin response, the measured hydration level, the measured player temperature, the measured blood pressure, the measured environmental condition, and the measured V02 max, the communication module is configured to generate a notification based of a need to modify a surrounding environment due to the measured environmental condition and to wirelessly communicate the notification to the flexible OLED display device;

the flexible OLED display device is configured to display the notification and to alter data displayed thereon in response to alternative data received from the programmable device;

the flexible OLED display device is further configured to display the measured sensor data in substantially real-time;

the communication module is further configured to wirelessly communicate data with the remote computing system using a secured communication link; and the flexible OLED display device, the environmental sensor, the physiological sensors, and the programmable device are configured to be controlled by the data received from the remote computing system.

15. The display sleeve claim 14, wherein the flexible OLED display device, the environmental sensor, the physiological sensors, the user input device, and the communication module are sealed such that water does not damage the flexible OLED display device, the environmental sensor, the physiological sensors, the user input device, and the communication module.

16. The display sleeve claim 14, wherein the user input device includes one or more of a selectable button, a touch screen, and an audio receiver.

17. The display sleeve claim 16, wherein:
the environmental sensor includes a video camera configured to capture a video image of the environment;
the communication module is configured to receive the video image and communicate the video image to the flexible OLED display device; and
the flexible OLED display device is configured to display the video image in real time.

18. The display sleeve claim 17, wherein in response to receipt of the measured heart rate, the measured steps, the measured physiological state, the measured galvanic skin response, the measured hydration level, the measured player temperature, the measured blood pressure, the measured environmental condition, and the measured V02 max, the communication module is configured to generate and to communicate a notification to the flexible OLED display device including a notice regarding a need for a medication.

19. The display sleeve claim 18, further comprising a speaker that is communicatively coupled to the communication module, wherein:
- the communication module is further configured to receive data from the programmable device and/or the remote computing system;
- the received data includes data related to display of colors and patterns on the flexible display device;
- the received data further includes audio data; and
- the flexible display device is configured to synchronize changes in display of the colors and patterns with music played by the speakers based on the audio data, wherein:
- the communication module is incorporated into at least one of the environmental sensor, the physiological sensors, and the flexible OLED display device; and
- the environmental condition includes one or more or a combination of an environmental temperature, a light, a sound, a barometric pressure, a humidity, an altitude, an air quality, a pollen count, and an air particulate count.

20. A display sleeve comprising:
- an outer surface;
- a panel circumferentially wrapped around the outer surface; and
- a display system implemented using the panel, wherein the display system includes:
  - a flexible organic light emitting diode (OLED) display device implemented on an outer surface of the panel such that the flexible OLED display device is viewable and accessible by a user with the display sleeve worn on an arm of the user, wherein the flexible OLED display device is configured to receive and to display data and to receive user input and communicate a signal representative of the user input;
  - an environmental sensor that is incorporated in the display sleeve, wherein the environmental sensor is configured to collect in real-time data pertaining to an environmental condition in the environment;
  - physiological sensors that are incorporated into the outer surface of the display sleeve, wherein the physiological sensors are configured to measure in real-time data indicative of a physiological state of the user;
  - a user input device that is incorporated in the display sleeve, wherein the user input device is configured to receive user input from the user to control the environmental sensor and the physiological sensors, to respond to data displayed on the flexible OLED device, and the user input device is further configured to communicate a signal representative of the received user input; and
  - a communication module that is incorporated in the display sleeve, wherein the communication module is configured to receive data from a programmable device that is located externally to the display sleeve and a remote computing system and to communicate the received data to the flexible OLED display device, and the communication module is further configured to receive data from the user input device, the physiological sensors, the environmental sensor, and the flexible OLED display device and to communicate the data to the programmable device or the remote computing system;

wherein:
- the measured data indicative the physiological state are wirelessly communicated to the communication module and further wirelessly communicated to the remote computing system for view by a second entity associated with the remote computing system;
- the measured environmental condition is wirelessly communicated to the communication module and the remote computing system for view by the second entity;
- in response to receipt of the measured data indicative the physiological state and the measured environmental condition, the communication module is configured to generate a notification based of a need to modify a surrounding environment due to the measured environmental condition and to wirelessly communicate the notification to the flexible OLED display device;
- the flexible OLED display device is configured to display the notification and to alter data displayed thereon in response to alternative data received from the programmable device in real-time;
- the communication module is further configured to wirelessly communicate data with the remote computing system using a secured communication link; and
- the flexible OLED display device, the environmental sensor, the physiological sensors, and the programmable device are configured to be controlled by the data received from the remote computing system.

* * * * *